United States Patent
Hosseini et al.

(10) Patent No.: US 10,993,215 B2
(45) Date of Patent: Apr. 27, 2021

(54) SPDCCH REUSE INDICATION CONSTRAINT UNDER DMRS SHARING

(71) Applicant: QUALCOMM Incorporated, San Diego, CA (US)

(72) Inventors: Seyedkianoush Hosseini, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 16/276,131

(22) Filed: Feb. 14, 2019

(65) Prior Publication Data
US 2019/0261327 A1     Aug. 22, 2019

Related U.S. Application Data

(60) Provisional application No. 62/710,450, filed on Feb. 16, 2018.

(51) Int. Cl.
*H04W 72/04* (2009.01)
*H04L 5/00* (2006.01)

(52) U.S. Cl.
CPC ......... *H04W 72/042* (2013.01); *H04L 5/005* (2013.01); *H04L 5/0007* (2013.01); *H04L 5/0051* (2013.01); *H04L 5/0053* (2013.01); *H04W 72/0453* (2013.01)

(58) Field of Classification Search
CPC ............ H04W 72/042; H04W 72/0453; H04L 5/0007; H04L 5/005; H04L 5/0051; H04L 5/0053
USPC .......................................................... 370/330
See application file for complete search history.

(56) References Cited

U.S. PATENT DOCUMENTS

| | | | | |
|---|---|---|---|---|
| 2017/0339454 | A1* | 11/2017 | Meng | H04L 5/0007 |
| 2018/0242347 | A1* | 8/2018 | Sahlin | H04W 72/14 |
| 2018/0302916 | A1* | 10/2018 | Lee | H04L 1/1854 |
| 2019/0349052 | A1* | 11/2019 | Yum | H04W 24/10 |

FOREIGN PATENT DOCUMENTS

EP        3247067 A1    11/2017

OTHER PUBLICATIONS

International Search Report and Written Opinion—PCT/US2019/018180—ISA/EPO—dated May 17, 2019.

* cited by examiner

*Primary Examiner* — Chi Tang P Cheng
(74) *Attorney, Agent, or Firm* — Qualcomm Incorporated

(57) ABSTRACT

Methods, systems, and devices for wireless communications are described. A wireless device such as a user equipment (UE) may receive a first downlink shared channel transmission over a first set of frequency resources in a first transmission time interval (TTI); receive a downlink control transmission including a grant of a second set of frequency resources of a second TTI for a second downlink shared channel transmission, the downlink control transmission including an indication that a demodulation reference signal of the first downlink shared channel transmission is reused for the second downlink shared channel transmission; determine to rate match the second downlink shared channel transmission around resources of the second set of frequency resources that are not part of the first set of frequency resources, and receive the second downlink shared channel transmission over a subset of the second set of frequency resources.

36 Claims, 11 Drawing Sheets

SPDCCH REUSE INDICATION CONSTRAINT UNDER DMRS SHARING

CROSS REFERENCES

The present application for patent claims the benefit of U.S. Provisional Patent Application No. 62/710,450 by HOSSEINI, et al., entitled "SPDCCH Reuse Indication Constraint Under DMRS Sharing," filed Feb. 16, 2018, assigned to the assignee hereof, and expressly incorporated herein.

BACKGROUND

The following relates generally to wireless communications, and more specifically to shortened physical downlink control channel (sPDCCH) reuse indication constraint under demodulation reference signal (DMRS) sharing.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, the smallest unit of resources (e.g., frequency and time resources) that may be allocated to a user may be referred to as a resource block (RB). A UE capable of communicating over shortened Transmission Time Intervals (sTTIs) may be allocated a resource block (RB) set, including one or more RBs, which the UE may use for receiving control information. In some cases, the UE may identify its grants (e.g., downlink grant) in the allocated RB set. For instance, the downlink grant included in downlink control information (DCI) or shortened DCI, may provide an indication of a resource allocation for downlink data transmissions over a physical downlink shared channel (PDSCH) or a shortened PDSCH (sPDSCH). Challenges may arise with use and allocation of sDCI and sPDSCH resources.

SUMMARY

The described techniques relate to improved methods, systems, devices, or apparatuses that support shortened physical downlink control channel (sPDCCH) reuse indication constraint under demodulation reference signal (DMRS) sharing. In some cases, wireless communications systems may support DMRS sharing across two consecutive sTTIs within the same subframe. In some aspects, a DMRS of a first downlink shared channel transmission (e.g., sPDSCH) transmitted over a first transmission time interval (TTI), may be reused for a second subsequent sPDSCH transmission in a second TTI. In some cases, a UE receiving the second sPDSCH transmission may utilize the DMRS from the first sPDSCH transmission in order to demodulate the second sPDSCH transmission. The UE may be configured to rate match the second sPDSCH in a way that reuses frequency resources of one or more resource block (RB) sets allocated for control information for the sPDSCH. The UE may determine a configuration to rate match the second sPDSCH based on whether DMRS sharing is enabled, and based on the frequency resource overlap between the first sPDSCH and resources of RB sets that may be reallocated from the RB sets to the second sPDSCH.

A method of wireless communication is described. The method may include receiving a first downlink shared channel transmission over a first set of frequency resources in a first TTI, receiving a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, determining whether to rate match the second downlink shared channel transmission around resources of the second set of frequency resources that are not part of the first set of frequency resources, and receiving the second downlink shared channel transmission over at least a subset of the second set of frequency resources of the second TTI based at least in part on the determining whether to rate match the second downlink shared channel transmission.

An apparatus for wireless communication is described. The apparatus may include means for receiving a first downlink shared channel transmission over a first set of frequency resources in a TTI, means for receiving a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, means for determining whether to rate match the second downlink shared channel transmission around resources of the second set of frequency resources that are not part of the first set of frequency resources, and means for receiving the second downlink shared channel transmission over at least a subset of the second set of frequency resources of the second TTI based at least in part on the determining whether to rate match the second downlink shared channel transmission.

Another apparatus for wireless communication is described. The apparatus may include a processor, memory in electronic communication with the processor, and instructions stored in the memory. The instructions may be operable to cause the processor to receive a first downlink shared channel transmission over a first set of frequency resources in a first TTI, receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, determine whether to rate match the second downlink shared channel transmission around resources of the second set of frequency resources that are not part of the first set of frequency resources, and receive the second downlink shared channel transmission over at least a subset of the second set of frequency resources of the second TTI based at least in part on the determining whether to rate match the second downlink shared channel transmission.

A non-transitory computer-readable medium for wireless communication is described. The non-transitory computer-readable medium may include instructions operable to cause a processor to receive a first downlink shared channel transmission over a first set of frequency resources in a first TTI, receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, determine whether to rate match the second downlink shared channel transmission around resources of the second set of frequency resources that are not part of the first set of frequency resources, and receive the second downlink shared channel transmission over at least a subset of the second set of frequency resources of the second TTI based at least in part on the determining whether to rate match the second downlink shared channel transmission.

In some examples of the method, apparatus, and non-transitory computer-readable medium described herein, the determining whether to rate match the second downlink shared channel transmission comprises determining to rate match the second downlink shared channel transmission around resources corresponding to a second downlink control transmission in the first TTI.

In some examples of the method, apparatus, and non-transitory computer-readable medium described herein, the second set of frequency resources encompasses the resources corresponding to a second downlink control transmission in the first TTI.

In some examples of the method, apparatus, and non-transitory computer-readable medium described herein, the determining whether to rate match the second downlink shared channel transmission may be based at least in part on a number of layers of the second downlink shared channel transmission.

Some examples of the method, apparatus, and non-transitory computer-readable medium described herein may further include processes, features, means, or instructions for determining that the resources of the second set of frequency resources that may be not part of the first set of frequency resources may be associated with a second downlink control transmission in the first TTI, the second downlink control transmission including a control channel demodulation reference signal. Some examples of the method, apparatus, and non-transitory computer-readable medium described herein may further include processes, features, means, or instructions for receiving at least a portion of the second downlink shared channel transmission over the resources in the second TTI.

Some examples of the method, apparatus, and non-transitory computer-readable medium described herein may further include processes, features, means, or instructions for demodulating the at least the portion of the second downlink shared channel transmission using the control channel demodulation reference signal.

In some examples of the method, apparatus, and non-transitory computer-readable medium described herein, the downlink control transmission includes a rate matching indicator. In some examples of the method, apparatus, and non-transitory computer-readable medium described herein, the determining whether to rate match the second downlink shared channel transmission may be based at least in part on the rate matching indicator.

In some examples of the method, apparatus, and non-transitory computer-readable medium described herein, the rate matching indicator includes a first indicator associated with a first group of resources of the second set of frequency resources and a second indicator associated with a second group of resources of the second set of frequency resources.

In some examples of the method, apparatus, and non-transitory computer-readable medium described herein, the determining whether to rate match includes determining whether to rate match around the resources of the second set of frequency resources that may be not part of the first set of frequency resources for the first group of resources and the second group of resources.

In some examples of the method, apparatus, and non-transitory computer-readable medium described herein, the demodulation reference signal of the first downlink shared channel transmission may be used for channel estimation for all allocated frequency resource blocks of the second TTI.

A method of wireless communication is described. The method may include receiving a first downlink shared channel transmission over a first set of frequency resources in a first transmission TTI, receiving a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, determining that the second set of frequency resources includes resources that are not part of the first set of frequency resources, and suppressing reception of the second downlink shared channel transmission.

An apparatus for wireless communication is described. The apparatus may include means for receiving a first downlink shared channel transmission over a first set of frequency resources in a first TTI, means for receiving a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, means for determining that the second set of frequency resources includes resources that are not part of the first set of frequency resources, and means for suppressing reception of the second downlink shared channel transmission.

Another apparatus for wireless communication is described. The apparatus may include a processor, memory in electronic communication with the processor, and instructions stored in the memory. The instructions may be operable to cause the processor to receive a first downlink shared channel transmission over a first set of frequency resources in a first TTI, receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, determine that the second set of frequency resources includes resources that are not part of the first set of frequency resources, and suppress reception of the second downlink shared channel transmission.

A non-transitory computer-readable medium for wireless communication is described. The non-transitory computer-readable medium may include instructions operable to cause a processor to receive a first downlink shared channel transmission over a first set of frequency resources in a first TTI, receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, determine that the second set of frequency resources includes resources that are not part of the first set of frequency resources, and suppress reception of the second downlink shared channel transmission.

Some examples of the method, apparatus, and non-transitory computer-readable medium described herein may further include processes, features, means, or instructions for transmitting a negative acknowledgement message in response to the downlink control transmission.

DETAILED DESCRIPTION

Figure 1:
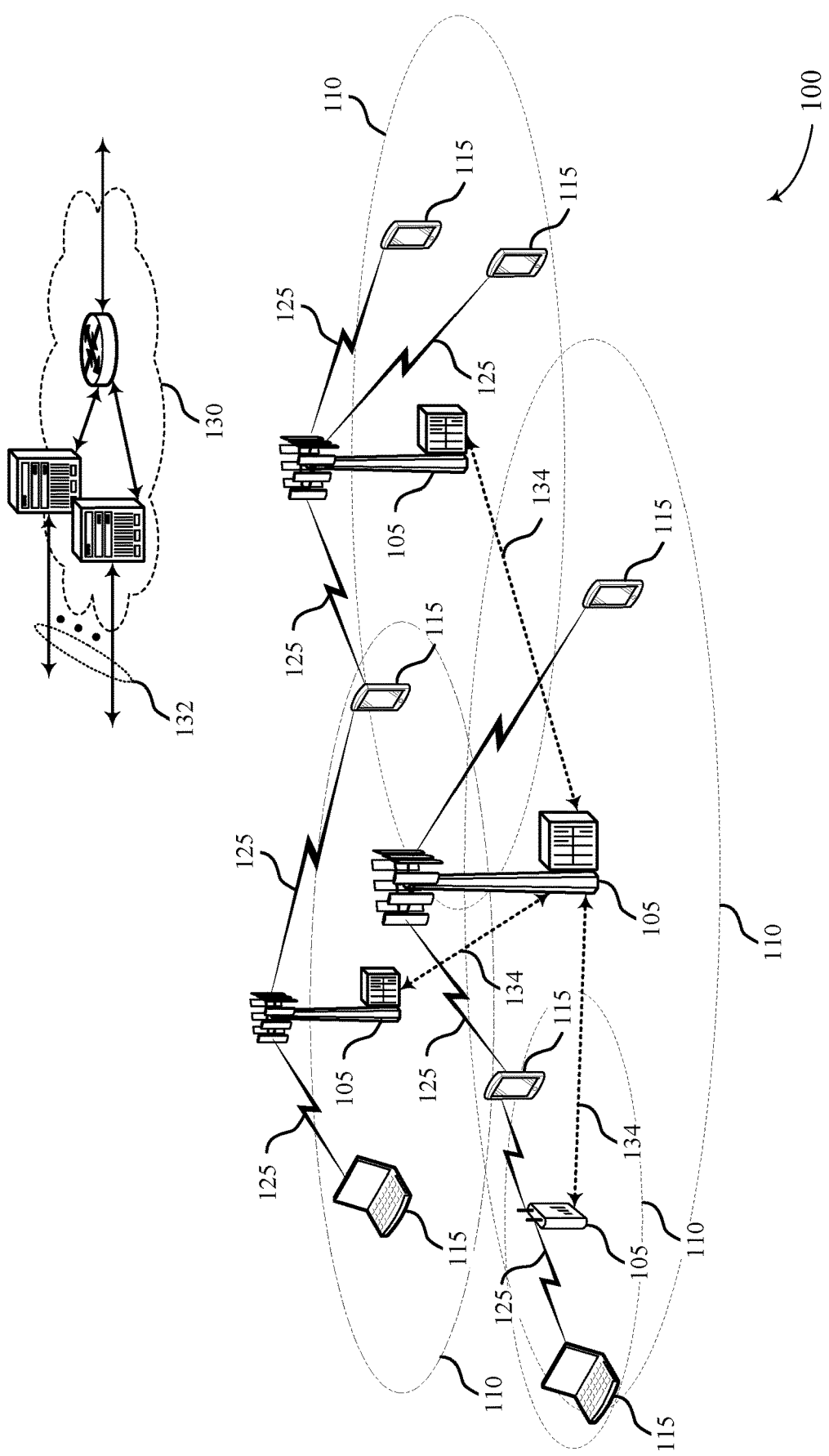
FIG. 1 illustrates an example of a system for wireless communication that supports shortened physical downlink control channel (sPDCCH) reuse indication constraint under demodulation reference signal (DMRS) sharing in accordance with aspects of the present disclosure.

In some cases, a user equipment (UE) capable of communicating over shortened transmission time intervals (sTTIs) may be allocated (e.g., by a base station) one or more resource block (RB) sets, including one or more resource blocks (RBs), for receiving control information. In some cases, the UE may find grants (e.g., downlink grant), which may assist the UE in determining when to receive or transmit data transmissions, in an allocated RB set. A downlink grant, which may be a downlink control information (DCI) or a shortened DCI (sDCI) (e.g., a DCI or an sDCI with DCI format 7-1F or DCI format 7-1G), may provide an indication of resource allocation for downlink data transmissions over a physical downlink shared channel (PDSCH). In some cases, not all RBs of an RB set may be used for control information for a given sTTI. In such cases, a UE may reuse RB resources for downlink data transmissions over PDSCH (e.g., instead of control information). However, resources allocated for downlink data transmissions may overlap with an RB allocation for control information (or the RB set). In some cases, an sTTI may span a sub-slot.

In some cases, each RB set may be configured with one or more semi-static rate matching modes. For instance, a first mode for rate matching may involve the UE rate matching around downlink control information (e.g., an sDCI) scheduling a PDSCH if the downlink control information is transmitted in a RB set. Further, no rate matching may be performed if an sDCI, which may be an example of downlink control information, is not transmitted in the RB set (e.g., the sDCI is transmitted in a different RB set in the given sTTI). In a second mode of semi-static rate matching, the UE may rate match around the entire RB set (i.e., entire frequency region within the RB set). In a third mode of semi-static rate matching, the UE may rate match around the entire RB set if an sDCI used for scheduling sPDSCH is identified by the UE. For instance, if the UE detects sDCI in a first RB set in a first TTI, the UE may rate match around the first RB set. However, if the UE is configured with multiple RB sets, the UE may not rate match around other RB sets in the first TTI (e.g., any RB sets that do not contain sDCI). In a fourth mode of semi-static rate matching, the UE may rate match around the entire RB set if an sDCI used for scheduling PDSCH is not found or identified, otherwise, the UE may only rate-match around the sDCI scheduling PDSCH. In some cases, if sDCI scheduling sPDSCH is transmitted by the base station and two or more RB sets are overlapping, the sDCI may be assumed to be found in both RB sets.

In other cases (e.g., in addition to semi-static rate-matching modes), a UE may be capable of supporting dynamic rate-matching. In some aspects, a 2-bit indication field may be added to the sDCI by the network or a base station. In some cases, if a UE is configured by higher layers to reuse sPDCCH for sPDSCH (e.g., via an L1 message), one or more of the following cases may be applied. In a first example, if the UE is configured with at least two RB sets, the UE may receive a 1-bit indication for each RB set (e.g., {1,1}). In a second example, if the UE is configured with either one or two RB sets, the UE may receive a 2-bit indication for the first RB set (e.g., {2,0}) in the sDCI. Further, the UE may receive a 2-bit indication for the second RB set (e.g., {0,2}) if configured with two RB sets.

In some cases, a 1-bit indication (e.g., {1,1} indicated for two RB sets) may specify if the UE should rate-match sPDSCH around overlapping resources used for the RB set and the sPDSCH. In other cases, sTTI control channel elements (sCCEs) forming an RB set may be split into two groups. For instance, the first group of sCCEs may include sCCEs that are not overlapping with sPDCCH, while the second group of sCCEs may include sCCEs overlapping with sPDSCH. Thus, a 2-bit indication (e.g., {2,0} or {0,2}) may be used for the two sCCE groups. For example, the first bit may indicate whether the sPDSCH should be rate-matched around the sCCEs in the first group, while the second bit may indicate if the sPDSCH should be rate-matched around the sCCEs in the second group.

In some cases, wireless communications systems may support sub-slot sTTIs. In such cases, demodulation reference signal (DMRS) sharing may be supported across two consecutive sTTIs. DMRS may also be known as UE-specific reference signals (UE-RS) and may be utilized by the UE for channel estimation. If a DMRS is transmitted in sTTI 'n', the UE may receive an indication in the sDCI in sTTI 'n+1' that the DMRS transmitted in sTTI 'n' may be used for sTTI 'n+1'. In such cases, the sPDSCH allocation in the sTTI 'n+1' may be exactly the same as or may be a subset of the sPDSCH allocation in sTTI 'n' (i.e., a subset of the RBs allocated to sPDSCH). In other cases, the sPDSCH allocation in the sTTI 'n+1' may not be a subset of the sPDSCH allocation in sTTI 'n' (e.g., during semi-static rate matching and/or L1 based sPDCCH reuse for sPDSCH). For instance, in sTTI 'n', sCCEs indexed 0-3 may be used to transmit the downlink sDCI, while in sTTI 'n+1', sCCEs indexed 4-7 may be used for sDCI. As DMRS may not be present in sTTI 'n+1', and the UE may be operating in the first mode of semi-static rate-matching (i.e., the UE may rate-match sPDCCH around a downlink sDCI, the UE may use the DMRS from the previous sTTI for demodulating the sPDSCH.

In one example, the RBs allocated to sPDSCH in sTTI 'n+1' may not be a subset of those allocated to sPDSCH in sTTI 'n'. In a first deployment scheme, a UE may receive an indication to reuse the DMRS from sTTI 'n' during sTTI 'n+1'. In such cases, besides utilizing a 1-bit or 2-bit L1-based sPDCCH reuse indication for sTTI 'n+1', the UE may rate-match sPDSCH for sTTI 'n+1' around RBs that were not usable for sPDSCH in sTTI 'n'. Referring to the example described above, since sPDSCH rate matching was performed around the RBs that were occupied by sCCEs indexed 0-3 in sTTI 'n', sPDSCH rate matching may be performed around sCCEs index 0-7 in sTTI 'n+1', to allow channel estimation for all RBs of sPDSCH in sTTI 'n+1'.

Additionally or alternatively, if a single (or one) layer sPDSCH is transmitted in sTTI 'n+1', and the UE receives an indication to reuse DMRS from sTTI 'n', the UE may only rate match around the resources indicated in sTTI 'n+1' (e.g., according to the rate matching modes discussed herein). In some cases, the sPDCCH may be transmitted via a single layer, and the DMRSs transmitted in sDCI resources over sTTI 'n' may be used for sPDSCH demodulation in sTTI 'n+1'. In other cases, the determination to rate-match the second sPDSCH transmission (i.e., sPDSCH in sTTI 'n+1') may be based in part on a number of layers of the second sPDSCH transmission. Further, the number of layers used in any particular transmission may be based at least in part on the Rank Indication (RI) feedback from the UE, which may identify the number of layers the UE may discern. In some cases, the number of layers may be less than or equal to the number of antenna ports. In a third deployment scheme, in sTTI 'n+1', the sPDSCH may be expected to be mapped to a subset of useable RBs in sTTI 'n'. In such cases, the UE may follow instructions transmitted by the base station (e.g., via sDCI) for sTTI 'n+1', unless the sPDSCH for sTTI 'n+1' is not the same or a subset of RBs for sPDSCH in sTTI 'n'. In such cases, the UE may drop or suppress receiving the sPDSCH for sTTI 'n+1'.

Alternatively (e.g., for DCIs or sDCIs with DCI format 7-1F or 71-G), the UE may assume the presence of UE-specific reference signals (e.g., DMRS) in sTTI 'n' (e.g., an sTTI of a subslot 'n') in all RBs or shortened Physical Resource Groups (sPRGs) that the sPDSCH in sTTI 'n+1' (e.g., an sTTI of a subslot 'n+1') is mapped to (e.g., RBs or sPRGs of sTTI 'n'). Such an assumption may be made when DMRS is not present in sTTI 'n+1', as may be indicated by the sDCI in sTTI 'n+1'. Thus, in some examples the UE may not need to compare or keep track of the RBs for previous sPDSCH assignments for DMRS sharing across sTTIs. Instead, the UE may assume that channel estimates are available for all RBs or sPRGs of the current sTTI if the UE receives an indication that DMRS is not present in the current sTTI. Thus, the UE may store channel estimates for DMRS for all allocated RBs or sPRGs any sTTI with DMRS, for possible reuse in subsequent sTTIs. According to one aspect, the base station may, for any current sTTI in which the base station indicates to the UE that DMRS is not present (e.g., via sDCI), ensure that DMRS are present in the preceding sTTI for all RBs or sPRGs of the sPDSCH allocation for the current sTTI. For example, if the UE is configured in the first rate matching mode to rate match around sDCI in an RB set in a first sTTI, the base station may ensure that any sPDSCH allocation in a second sTTI (e.g., the next sTTI), accounting for rate matching, is the same or a subset of RBs or sPRGs in the first sTTI, or that the corresponding RBs or sPRGs in the first sTTI otherwise include DMRS (e.g., sDCI including DMRS from the same antenna port as the sPDSCH in the second sTTI).

Aspects of the disclosure are initially described in the context of a wireless communications system. Aspects of the disclosure are further illustrated by and described with reference to resource grid diagrams, apparatus diagrams, system diagrams, and flowcharts that relate to sPDCCH reuse indication constraint under DMRS sharing.

FIG. 1 illustrates an example of a wireless communications system 100 that supports sPDCCH reuse indication constraint under DMRS sharing in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may support DMRS sharing across two consecutive sTTIs within the same subframe. In such cases, RBs allocated to a downlink data transmission (i.e., PDSCH or sPDSCH) in a second TTI or sTTI, may be a subset of those used in a first (or preceding) TTI or sTTI, and rate matching may be performed using one or more techniques described herein. In some cases (e.g., when DMRS is not present in a current sTTI (sTTI 'n+1')) the UE 115 may assume the presence of UE-specific reference signals (e.g., DMRS) in a previous sTTI (sTTI 'n') for all sPRGs or RBs that the sPDSCH in the current sTTI (sTTI 'n+1') is mapped to (e.g., an sPRG or RB of sTTI 'n'). Thus, the UE 115 may not need to compare or keep track of the RBs allocated to sPDSCH in the prior sTTI (sTTI 'n'). In this case, it may be left to the base station 105 to provide sPDSCH allocations in accordance with the rate matching scheme that follow the assumption of DMRS presence by the UE 115. In some other cases, the sPDSCH allocation in the sTTI 'n+1' may not be a subset of the sPDSCH allocation in sTTI 'n', and a UE 115 may rate-match sPDSCH for sTTI 'n+1' around RBs that were not usable for sPDSCH in sTTI 'n'. In some cases, if the sPDSCH for sTTI 'n+1' may not be same or a subset of RBs for sPDSCH in sTTI 'n'. In such cases, the UE 115 may drop or suppress receiving the sPDSCH for sTTI 'n+1'.

Figure 2:
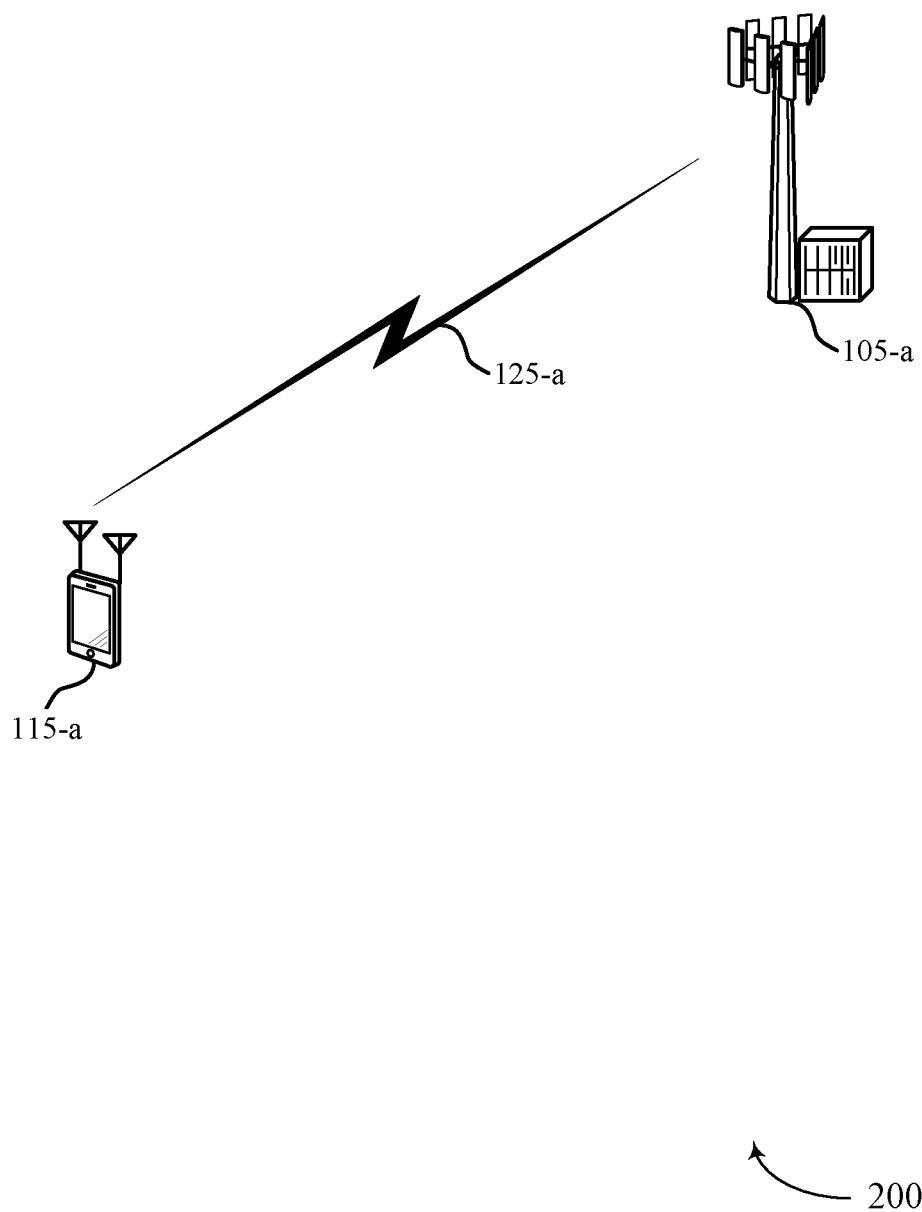
FIG. 2 illustrates an example of a wireless communications system that supports sPDCCH reuse indication constraint under DMRS sharing in accordance with aspects of the present disclosure.

FIG. 2 illustrates an example of a wireless communications system 200 that supports sPDCCH reuse indication constraint under DMRS sharing in accordance with aspects of the present disclosure. In some examples, wireless communications system 200 may implement aspects of wireless communications system 100. The wireless communications system 200 may include a UE 115-*a* and base station 105-*a*, which may be examples of a UE 115 and base station 105 as described with reference to FIG. 1. UE 115-*a* and base station 105-*a* may communicate using directional beams (e.g., mmW spectrum) or one or more spatial layers (not shown) over wireless communication link 125-*a*.

In some cases, UE 115-*a* may be capable of communicating over sTTIs. Further, UE 115-*a* may be allocated or configured with one or more RB sets or Control Resource Sets (CORESETs), including one or more RBs, for receiving control information. In some cases, UE 115-*a* may find one or more grants specific to UE 115-*a* in an RB set, such as downlink grants which may provide an indication of resource allocation for receiving downlink data transmissions. In some cases, not all configured RBs (e.g., for sPDCCH transmission) may be used for control information for a given sTTI. As such, UE 115-*a* and base station 105-*a* may reuse RB resources (e.g., RB resources upon which control information, such as an sDCI, was not received) for downlink data transmissions over PDSCH. In some cases, resources allocated for downlink data transmissions may overlap with RB allocation for control information (or the RB set). In such cases, UE 115-*a* may assume that the scheduled downlink shared channel (e.g., PDSCH or sPDSCH) is rate matched around the RB set when the scheduled PDSCH overlaps. In some cases, UE 115-*a* may be configured (e.g., by UE-specific radio resource control (RRC) signaling) to identify RB sets for which a PDSCH or sPDSCH may or may not be mapped, based on L1 signaling. In some cases, for a scheduled PDSCH or sPDSCH overlapping with an RB set, the L1 signaling may indicate whether the scheduled PDSCH or sPDSCH is rate matched around the RB set, or mapped to one or more resources in the RB set. In some cases, each RB set may be configured with one or more semi-static rate matching modes or dynamic rate matching modes, described herein with reference to FIG. 3.

In some cases, DMRS, which may be used for channel estimation, may be shared across two consecutive sTTIs within the same subframe. In some aspects, if a DMRS is transmitted in sTTI 'n', UE 115-*a* may receive an indication in the sDCI that the DMRS transmitted in sTTI 'n', may be used for sTTI 'n+1'. In such cases, the sPDSCH allocation in the sTTI 'n+1' may be the same or may be a subset of the sPDSCH allocation in sTTI 'n'. In other cases, the sPDSCH allocation in the sTTI 'n+1' may not be a subset of the sPDSCH allocation in sTTI 'n' (e.g., during semi-static rate matching and/or L1 based sPDCCH reuse for sPDSCH). In one example, if the RBs allocated to sPDSCH in sTTI 'n+1' are not be a subset of those allocated to sPDSCH in sTTI 'n', UE 115-*a* may either rate-match sPDSCH for sTTI 'n+1' around RBs that were not usable for sPDSCH in sTTI 'n', or, UE 115-*a* may drop or suppress receiving the sPDSCH for sTTI 'n+1'.

Figure 3:
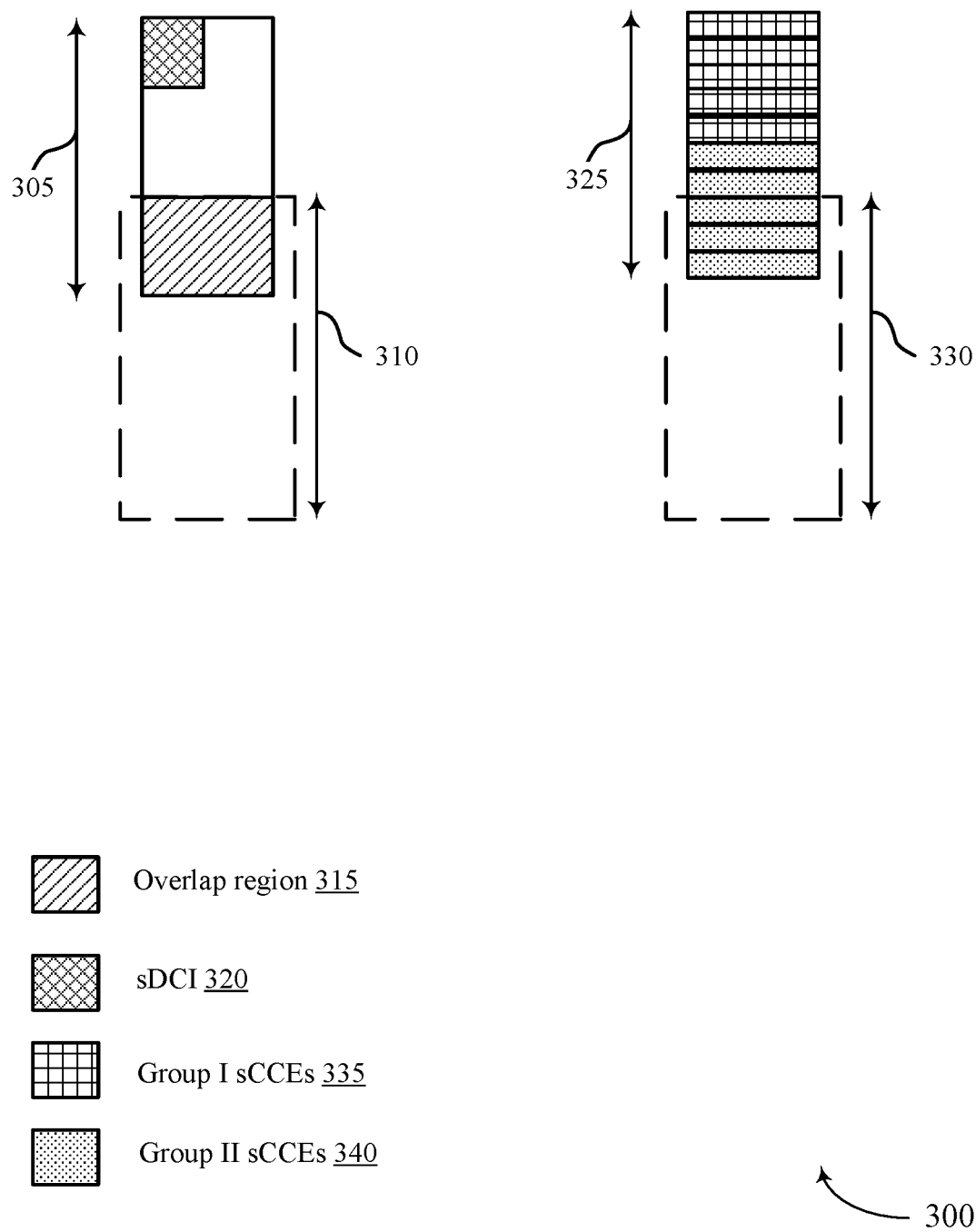
FIG. 3 illustrates an example of a resource grid that supports sPDCCH reuse indication constraint under DMRS sharing in accordance with aspects of the present disclosure.

FIG. 3 illustrates an example of a resource grid 300 that supports sPDCCH reuse indication constraint under DMRS sharing in accordance with aspects of the present disclosure. In some examples, resource grid 300 may implement aspects of wireless communications systems 100 and/or 200.

As previously described, in some cases, a first RB set 305 may be configured with one or more semi-static rate matching modes. As illustrated, a first mode for rate matching may involve a UE 115 reusing resources of RB set 305 for sPDSCH 310 and rate matching around sDCI 320. In some cases, no rate matching may be performed if the sDCI 320 allocating sPDSCH 310 is not transmitted in the RB set 305. For example, if the sDCI 320 is transmitted in a different RB set in the given sTTI (not shown), no rate matching for RB set 305 may be performed (e.g., the overlapping region 315 may be reused by sPDSCH 310). In a second mode for rate matching, a UE 115 may rate match around the entire RB set. For example, sPDSCH 310 may be rate matched around overlapping region 315, regardless of whether the sDCI associated with sPDSCH 310 was located in RB set 305.

In a third rate matching mode, a UE 115 may rate match around an entire RB set if an sDCI used for scheduling sPDSCH is identified by the UE 115 in the RB set. For instance, if the UE 115 detects the sDCI 320 in the first RB set 305 in the first sTTI, the UE 115 may rate match around the first RB set 305. However, if the UE 115 is configured with multiple RB sets, the UE 115 may not rate match around other RB sets overlapping with sPDSCH 310 in the first sTTI.

In a fourth mode of semi-static rate matching, a UE 115 may rate match around the entire RB set if an sDCI used for scheduling sPDSCH is not found or identified in the RB set. Otherwise, the UE 115 may only rate-match around the sDCI scheduling sPDSCH. In any one of the rate matching modes, if sDCI scheduling sPDSCH is transmitted by base station 105-*a*, and two or more RB sets are overlapping, the sDCI may be assumed to be found in both RB sets.

In other cases, in addition to semi-static rate-matching modes, a UE 115 may be capable of supporting dynamic rate-matching. In some aspects, a 2-bit indication field may be added to the sDCI 320 by base station 105-*a*. In some cases, if the UE 115 is configured by higher layers to reuse sPDCCH, one or more of the following cases may be applied. In a first example, if the UE 115 is configured with at least two RB sets, the UE 115 may receive a 1-bit indication for each RB set (e.g., {1,1}). In some cases, the 1-bit indication (i.e., {1,1} indicated for two RB sets) may specify if the UE 115 should rate-match sPDSCH around the overlapping region 315 whose resources may be used for the first RB set 305 and the sPDSCH 310.

If the UE 115 is configured with either one or two RB sets, the UE 115 may receive a 2-bit indication for the first RB set (e.g., {2,0}) in the sDCI. Further, the UE 115 may receive a 2-bit indication for the second RB set (e.g., {0,2}) if configured with two RB sets. In some cases, an sTTI control channel element (sCCE) forming a third RB set 325 may overlap with sPDSCH 330. The third RB set 325 may be split into two groups (e.g., Group I sCCEs 335, and Group II sCCEs 340), and a 2-bit indication may be used to specify the rate-matching. In some cases, a first bit may indicate whether the sPDSCH 330 should be rate-matched around the Group I sCCEs 335, while a second bit may indicate rate matching around the Group II sCCEs 340. The third RB set 325 may be split evenly into the two groups.

Figure 4:
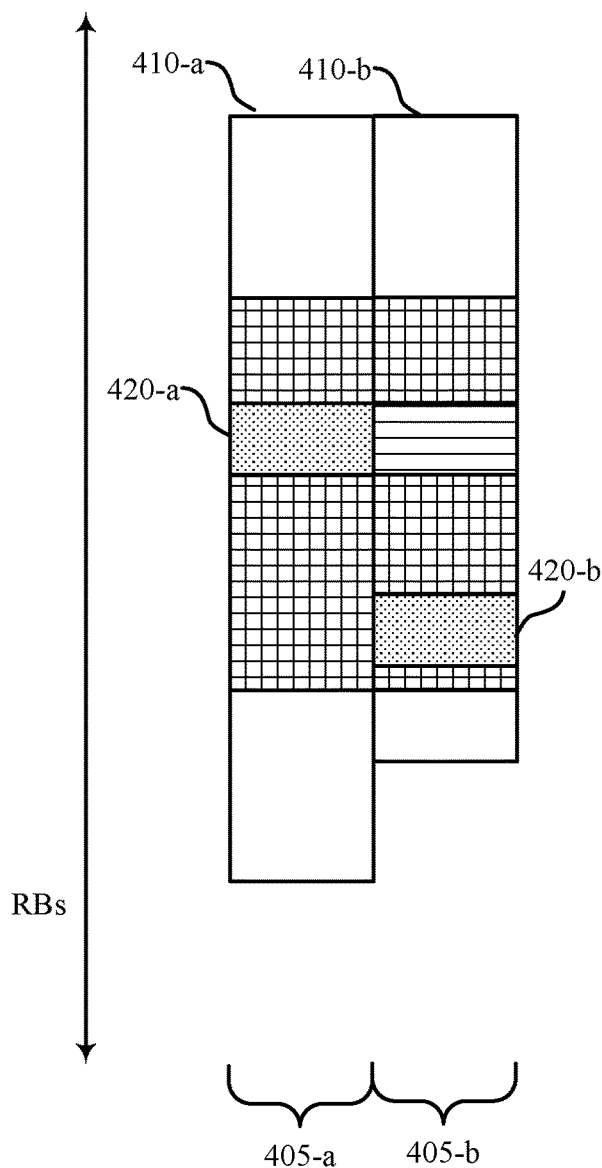
FIG. 4 illustrates an example of a resource grid that supports sPDCCH reuse indication constraint under DMRS sharing in accordance with aspects of the present disclosure.

FIG. 4 illustrates an example of a resource grid 400 that supports sPDCCH reuse indication constraint under DMRS sharing in accordance with aspects of the present disclosure. In some examples, resource grid 400 may be implemented by aspects of wireless communications systems 100 and/or 200.

As described herein, in some cases, DMRS sharing may be supported across two consecutive sTTIs 405 (e.g., sTTI 405-*a*, and sTTI 405-*b*), and the RBs allocated to sPDSCH 410-*b* in sTTI 405-*b* may be a subset of those allocated to sPDSCH 410-*a* in sTTI 405-*a*. It should be noted that region 415 includes sPDCCH resources re-claimed for sPDSCH 410-*b*. In some cases, a UE 115 may receive an indication to reuse the DMRS from sTTI 405-*a* during sTTI 405-*b*. In such cases, besides utilizing a 1-bit or 2-bit L1-based sPDCCH reuse indication for sTTI 405-*b* as described herein, the UE 115 may rate-match sPDSCH 410-*b* around RBs that were not usable for sPDSCH 410-*a* in sTTI 405-*a*.

In some aspects if rate matching was performed around the RBs that were occupied by DCI 420-*a* in sTTI 405-*a*, sPDSCH rate matching may be performed around DCI 420-*b* and region 425 (e.g., the region within sTTI 405-*b* corresponding to DCI 420-*a* in sTTI 405-*a*) for sPDSCH 410-*b*. DCI 420-*a* may be, for example, the DCI associated with sPDSCH 410-*b*, or DCI not associated with sPDSCH 410-*b* (e.g., a grant for sPDSCH 410-*a*, a grant for a different sPDSCH, or not including a grant). In some cases, rate matching around DCI 420-*b* and region 425 may enable channel estimation for all RBs of sPDSCH 410-*b* in sTTI 405-*b* using DMRS from sTTI 405-*a*.

Additionally or alternatively, rate matching around region 425 may not be performed if sPDSCH 410-*b* is transmitted via a single layer. Thus, the DMRS transmitted in DCI 420-*a* may be used for sPDSCH demodulation in sTTI 405-*b* because of antenna port correspondence between a DCI 420 and a sPDSCH 410 for single layer transmissions. Thus, the determination of whether to rate match around region 425 may depend on the number of layers for sPDSCH 410-*b*.

Figure 5:
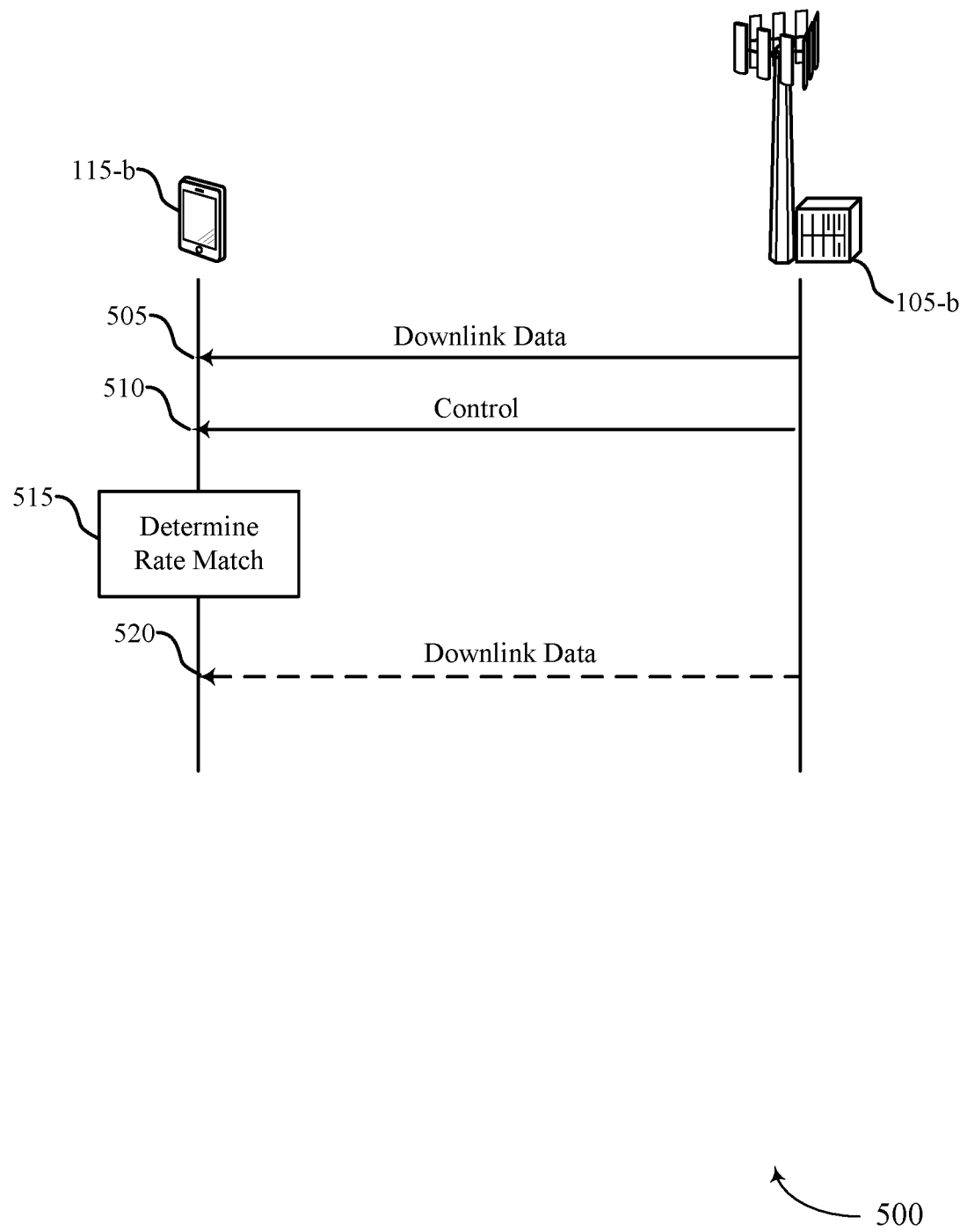
FIG. 5 illustrates an example of a process flow that supports sPDCCH reuse indication constraint under DMRS sharing in accordance with aspects of the present disclosure.

FIG. 5 illustrates an example of a process flow 500 that supports sPDCCH reuse indication constraint under DMRS sharing in accordance with aspects of the present disclosure. In some examples, process flow 500 may be implemented by aspects of wireless communications systems 100 and/or 200. Further, process flow 500 may be implemented by a UE 115-*b* and a base station 105-*b*, which may be examples of a UE 115 and a base station 105 as described with reference to FIGS. 1 and 2. In some examples, the process illustrated by process flow 500 may be implemented in a wireless communications system operating in mmW spectrum.

At 505, UE 115-*b* may receive, from the base station 105-*b*, a first downlink shared transmission including downlink data, over a first set of frequency resources in a first TTI or sTTI.

At 510, UE 115-*b* may receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission. In some cases, UE 115-*b* may determine that the resources of the second set of frequency resources that are not part of the first set of frequency resources are associated with a second downlink control transmission in the first TTI, the second downlink control transmission including a control channel demodulation reference signal. In some cases, the downlink control transmission may also include a rate matching indicator.

In other cases, UE 115-*b* may determine that the second set of frequency resources includes resources that are not part of the first set of frequency resources (e.g., the RBs allocated to sPDSCH in sTTI 'n+1' are not a subset of those used in sTTI 'n'), and may suppress reception at 520.

At 515, UE 115-*b* may determine whether to rate match the second downlink shared channel transmission around resources of the second set of frequency resources that are not part of the first set of frequency resources. In some cases, the determining whether to rate match the second downlink shared channel transmission may be based at least in part on a number of layers of the second downlink shared channel transmission, the rate matching indicator received at 510, or both.

At 520, UE 115-*b* may receive the second downlink shared channel transmission (or at least a portion of) over a subset of the second set of frequency resources of the second TTI, based at least in part on the determination to rate match the second downlink shared channel transmission, at 515. In other cases, UE 115-*b* may suppress or drop reception of the second downlink shared channel transmission, based on the determination at 510. In such cases, the UE 115-*b* may transmit a negative acknowledgement message in response to the downlink control transmission at 510.

Figure 6:
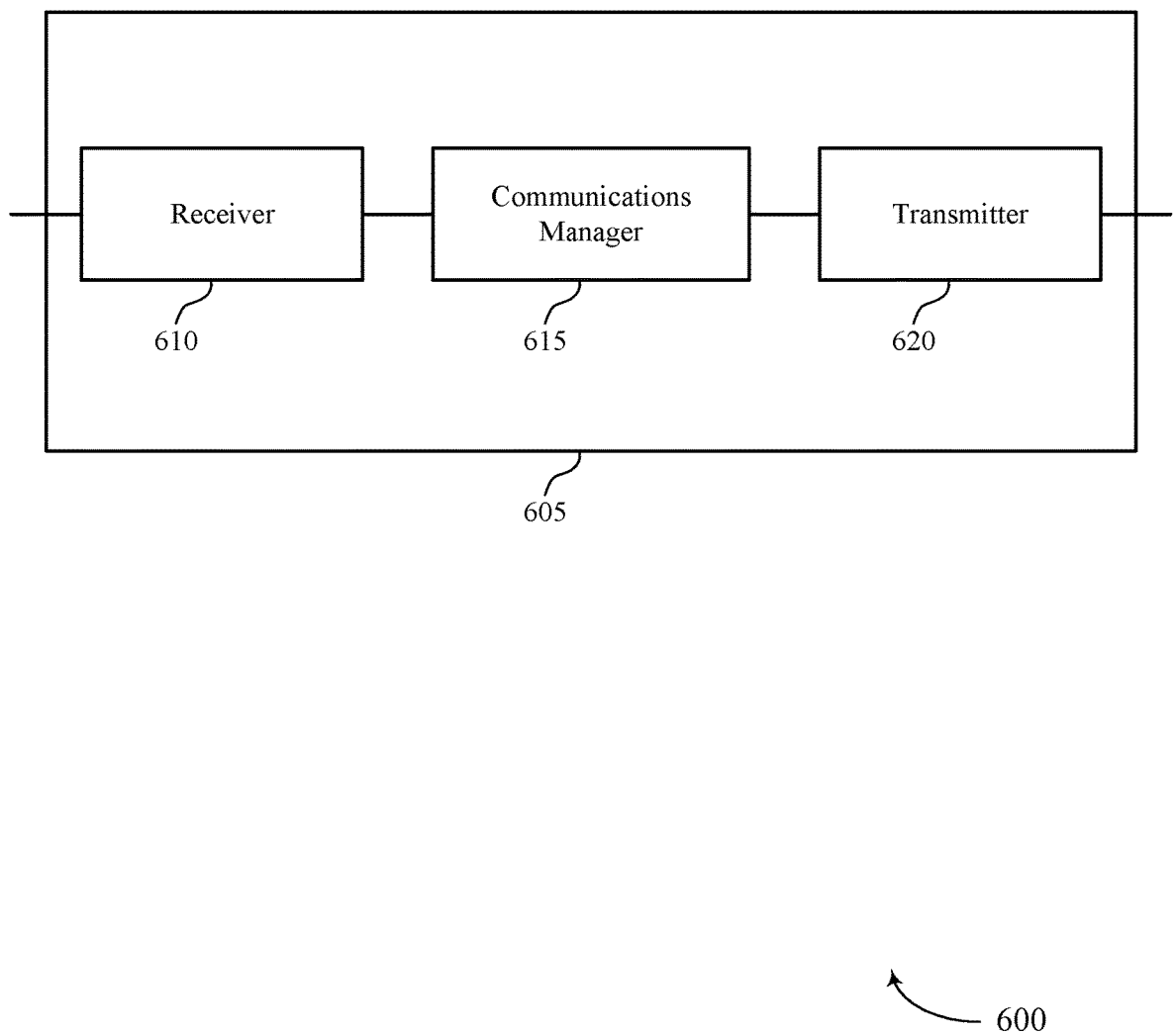
FIGS. 6 through 8 show block diagrams of a device that supports sPDCCH reuse indication constraint under DMRS sharing in accordance with aspects of the present disclosure.

FIG. 6 shows a block diagram 600 of a wireless device 605 that supports sPDCCH reuse indication constraint under DMRS sharing in accordance with aspects of the present disclosure. Wireless device 605 may be an example of aspects of a UE 115 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to sPDCCH reuse indication constraint under DMRS sharing, etc.). Information may be passed on to other components of the device. The receiver 610 may be an example of aspects of the transceiver 920 described with reference to FIG. 9. The receiver 610 may utilize a single antenna or a set of antennas.

Communications manager 615 may be an example of aspects of the communications manager 910 described with reference to FIG. 9.

Communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The communications manager 615 and/or at least some of its various sub-components may be physically located at various positions, including being distributed such that portions of functions are implemented at different physical locations by one or more physical devices. In some examples, communications manager 615 and/or at least some of its various sub-components may be a separate and distinct component in accordance with various aspects of the present disclosure. In other examples, communications manager 615 and/or at least some of its various sub-components may be combined with one or more other hardware components, including but not limited to an input/output (I/O) component, a transceiver, a network server, another computing device, one or more other components described in the present disclosure, or a combination thereof in accordance with various aspects of the present disclosure.

Communications manager 615 may receive a first downlink shared channel transmission over a first set of frequency resources in a first TTI, receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, determine whether to rate match the second downlink shared channel transmission around resources of the second set of frequency resources that are not part of the first set of frequency resources, and receive the second downlink shared channel transmission over at least a subset of the second set of frequency resources of the second TTI based on the determining whether to rate match the second downlink shared channel transmission.

In some cases, the communications manager 615 may also receive a first downlink shared channel transmission over a first set of frequency resources in a first TTI, receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission, determine that the second set of frequency resources includes resources that are not part of the first set of frequency resources, and suppress reception of the second downlink shared channel transmission. In some cases, the demodulation reference signal of the first downlink shared channel transmission may be reused for all frequency resources of the second TTI.

Transmitter 620 may transmit signals generated by other components of the device. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
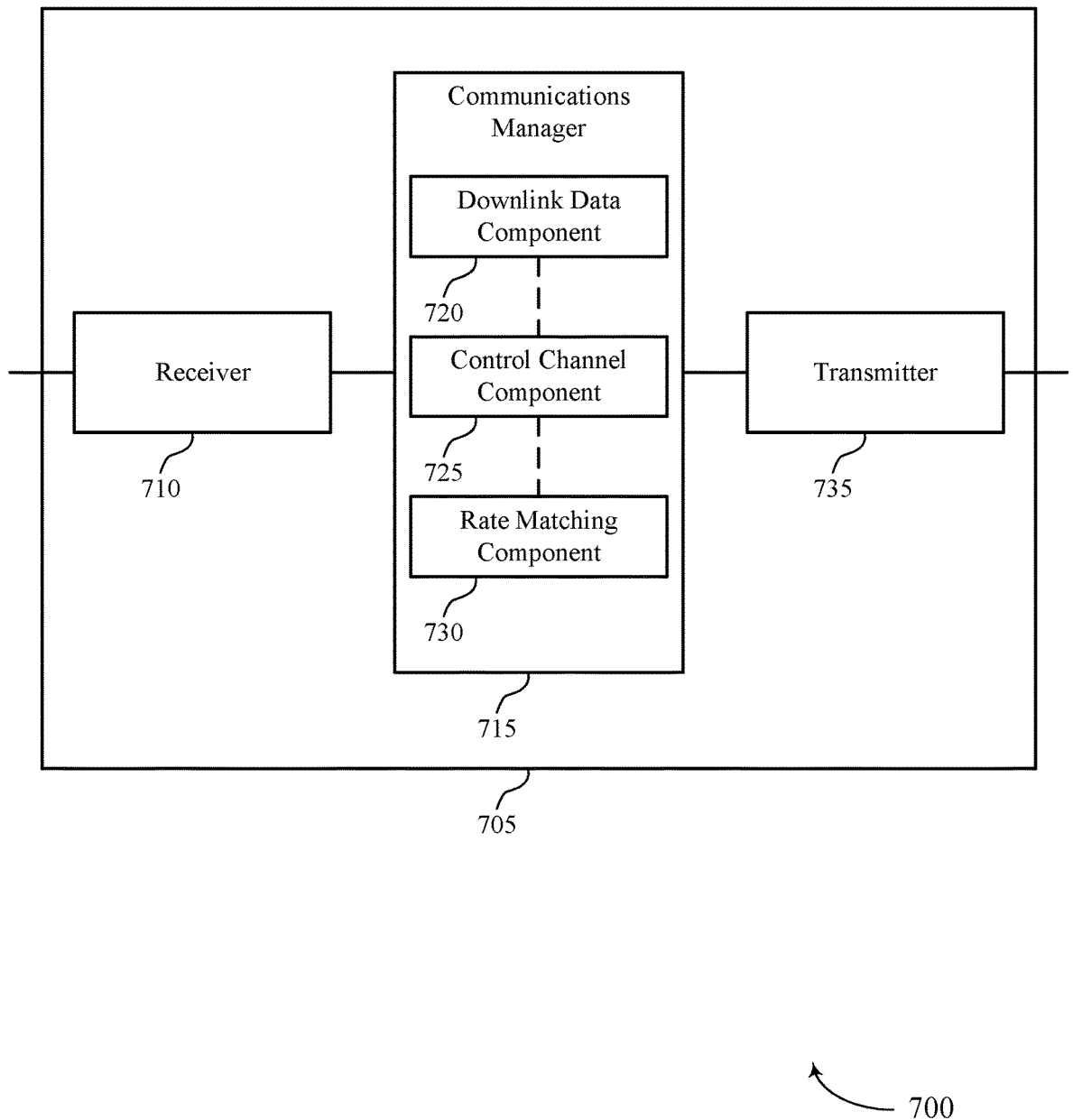

FIG. 7 shows a block diagram 700 of a wireless device 705 that supports sPDCCH reuse indication constraint under DMRS sharing in accordance with aspects of the present disclosure. Wireless device 705 may be an example of aspects of a wireless device 605 or a UE 115 as described with reference to FIGS. 1 and 605. Wireless device 705 may include receiver 710, communications manager 715, and transmitter 735. Wireless device 705 may also include a processor. Each of these components may be in communication with one another (e.g., via one or more buses).

Receiver 710 may receive information such as packets, user data, or control information associated with various information channels (e.g., control channels, data channels, and information related to sPDCCH reuse indication constraint under DMRS sharing, etc.). Information may be passed on to other components of the device. The receiver 710 may be an example of aspects of the transceiver 920 described with reference to FIG. 9. The receiver 710 may utilize a single antenna or a set of antennas.

Communications manager 715 may be an example of aspects of the communications manager 910 described with reference to FIG. 9.

Communications manager 715 may also include downlink data component 720, control channel component 725, and rate matching component 730.

Downlink data component 720 may receive a first downlink shared channel transmission over a first set of frequency resources in a first TTI and receive the second downlink shared channel transmission over at least a subset of the second set of frequency resources of the second TTI based on the determining whether to rate match the second downlink shared channel transmission.

Control channel component 725 may receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission.

Rate matching component 730 may determine whether to rate match the second downlink shared channel transmission around resources of the second set of frequency resources that are not part of the first set of frequency resources.

Downlink data component 720 may receive a first downlink shared channel transmission over a first set of frequency resources in a first TTI and suppress reception of the second downlink shared channel transmission.

Control channel component 725 may receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission and determine that the second set of frequency resources includes resources that are not part of the first set of frequency resources. In some cases, the demodulation reference signal of the first downlink shared channel transmission may be reused for all frequency resources of the second TTI.

Transmitter 735 may transmit signals generated by other components of the device. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
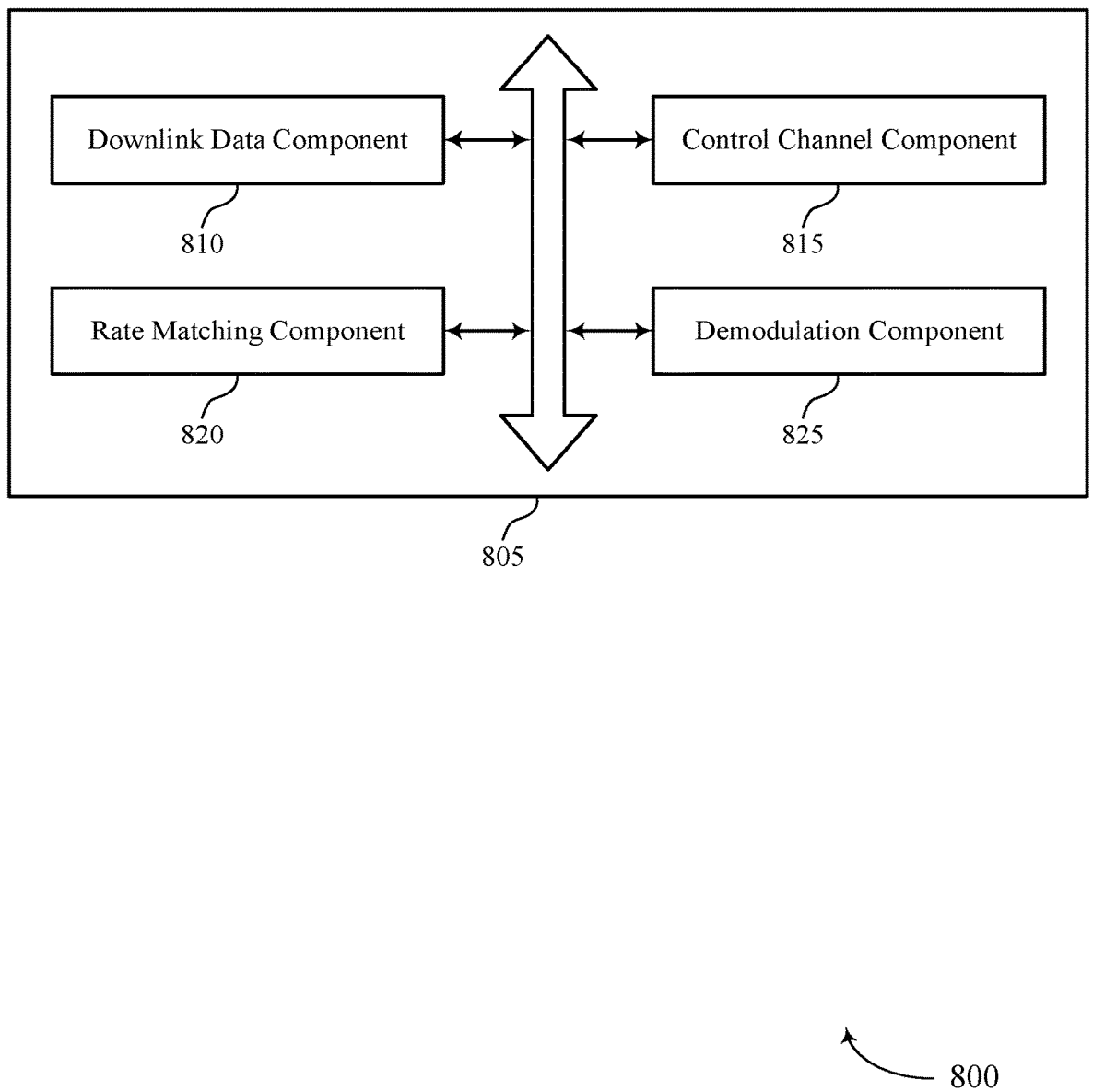

FIG. 8 shows a block diagram 800 of a communications manager 805 that supports sPDCCH reuse indication constraint under DMRS sharing in accordance with aspects of the present disclosure. The communications manager 805 may be an example of aspects of a communications manager 615, a communications manager 715, or a communications manager 910 described with reference to FIGS. 6, 7, and 9. The communications manager 805 may include downlink data component 810, control channel component 815, rate matching component 820, and demodulation component 825. Each of these modules may communicate, directly or indirectly, with one another (e.g., via one or more buses).

The downlink data component 810 may receive a first downlink shared channel transmission over a first set of frequency resources in a first TTI. In some examples, the downlink data component 810 may receive the second downlink shared channel transmission over at least a subset of the second set of frequency resources of the second TTI based on the determining whether to rate match the second downlink shared channel transmission. In some examples, the downlink data component 810 may receive a first downlink shared channel transmission over a first set of frequency resources in a first TTI. In some examples, the downlink data component 810 may suppress reception of the second downlink shared channel transmission. In some examples, the downlink data component 810 may receive at least a portion of the second downlink shared channel transmission over the resources in the second TTI.

The control channel component 815 may receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission. In some examples, the control channel component 815 may receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission. In some examples, the control channel component 815 may determine that the second set of frequency resources includes resources that are not part of the first set of frequency resources. In some examples, the second set of frequency resources encompasses the resources corresponding to a second downlink control transmission in the first TTI. In some examples, the control channel component 815 may determine that the resources of the second set of frequency resources that are not part of the first set of frequency resources are associated with a second downlink control transmission in the first TTI, the second downlink control transmission including a control channel demodulation reference signal. In some examples, the control channel component 815 may transmit a negative acknowledgement message in response to the downlink control transmission.

The rate matching component 820 may determine whether to rate match the second downlink shared channel transmission around resources of the second set of frequency resources that are not part of the first set of frequency resources. In some examples, the determining whether to rate match the second downlink shared channel transmission is based on a number of layers of the second downlink shared channel transmission. In some examples, the downlink control transmission includes a rate matching indicator. In some examples, the determining whether to rate match the second downlink shared channel transmission is based on the rate matching indicator. In some examples, the rate matching indicator includes a first indicator associated with a first group of resources of the second set of frequency resources and a second indicator associated with a second group of resources of the second set of frequency resources. In some examples, the determining whether to rate match includes determining whether to rate match around the resources of the second set of frequency resources that are not part of the first set of frequency resources for the first group of resources and the second group of resources. In some examples, the determining whether to rate match the second downlink shared channel transmission comprises determining to rate match the second downlink shared channel transmission around resources corresponding to a second downlink control transmission in the first TTI.

The demodulation component 825 may demodulate the at least the portion of the second downlink shared channel transmission using the control channel demodulation reference signal.

Figure 9:
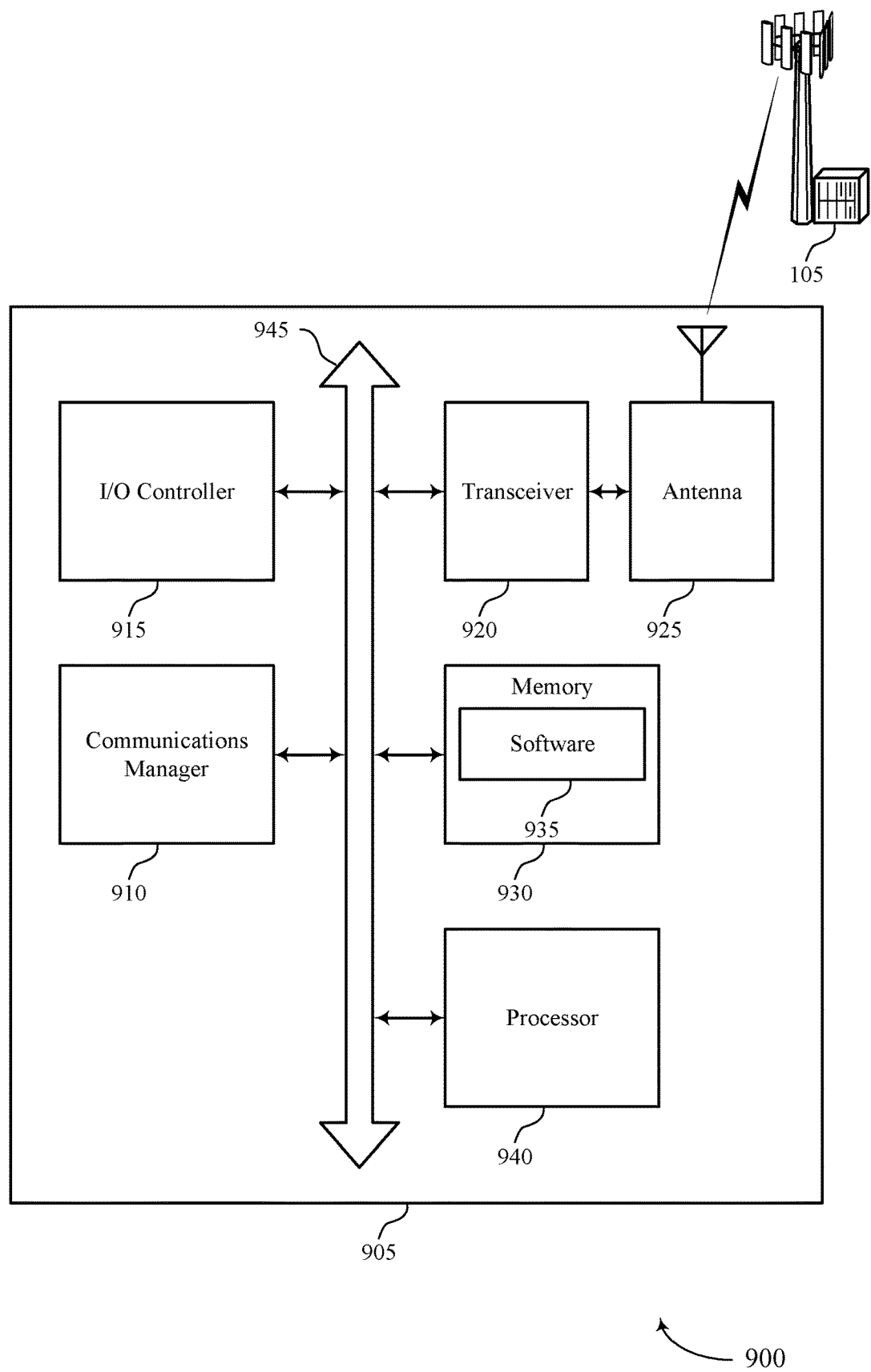
FIG. 9 illustrates a block diagram of a system including a user equipment (UE) that supports sPDCCH reuse indication constraint under DMRS sharing in accordance with aspects of the present disclosure.

FIG. 9 shows a diagram of a system 900 including a device 905 that supports sPDCCH reuse indication constraint under DMRS sharing in accordance with aspects of the present disclosure. Device 905 may be an example of or include the components of wireless device 605, wireless device 705, or a UE 115 as described herein, e.g., with reference to FIGS. 6 and 7. Device 905 may include components for bi-directional voice and data communications including components for transmitting and receiving communications, including communications manager 910, I/O controller 915, transceiver 920, antenna 925, memory 930, and processor 940. These components may be in electronic communication via one or more buses (e.g., bus 945).

I/O controller 915 may manage input and output signals for device 905. I/O controller 915 may also manage peripherals not integrated into device 905. In some cases, I/O controller 915 may represent a physical connection or port to an external peripheral. In some cases, I/O controller 915 may utilize an operating system such as iOS®, ANDROID®, MS-DOS®, MS-WINDOWS®, OS/2®, UNIX®, LINUX®, or another known operating system. In other cases, I/O controller 915 may represent or interact with a modem, a keyboard, a mouse, a touchscreen, or a similar device. In some cases, I/O controller 915 may be implemented as part of a processor. In some cases, a user may interact with device 905 via I/O controller 915 or via hardware components controlled by I/O controller 915.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

Memory 930 may include random-access memory (RAM) and read-only memory (ROM). The memory 930 may store computer-readable, computer-executable software 935 including instructions that, when executed, cause the processor to perform various functions described herein. In some cases, the memory 930 may contain, among other things, a basic input/output system (BIOS) which may control basic hardware or software operation such as the interaction with peripheral components or devices.

Processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 940 may be configured to operate a memory array using a memory controller. In other cases, a memory controller may be integrated into processor 940. Processor 940 may be configured to execute computer-readable instructions stored in a memory to perform various functions (e.g., functions or tasks supporting sPDCCH reuse indication constraint under DMRS sharing).

Figure 10:
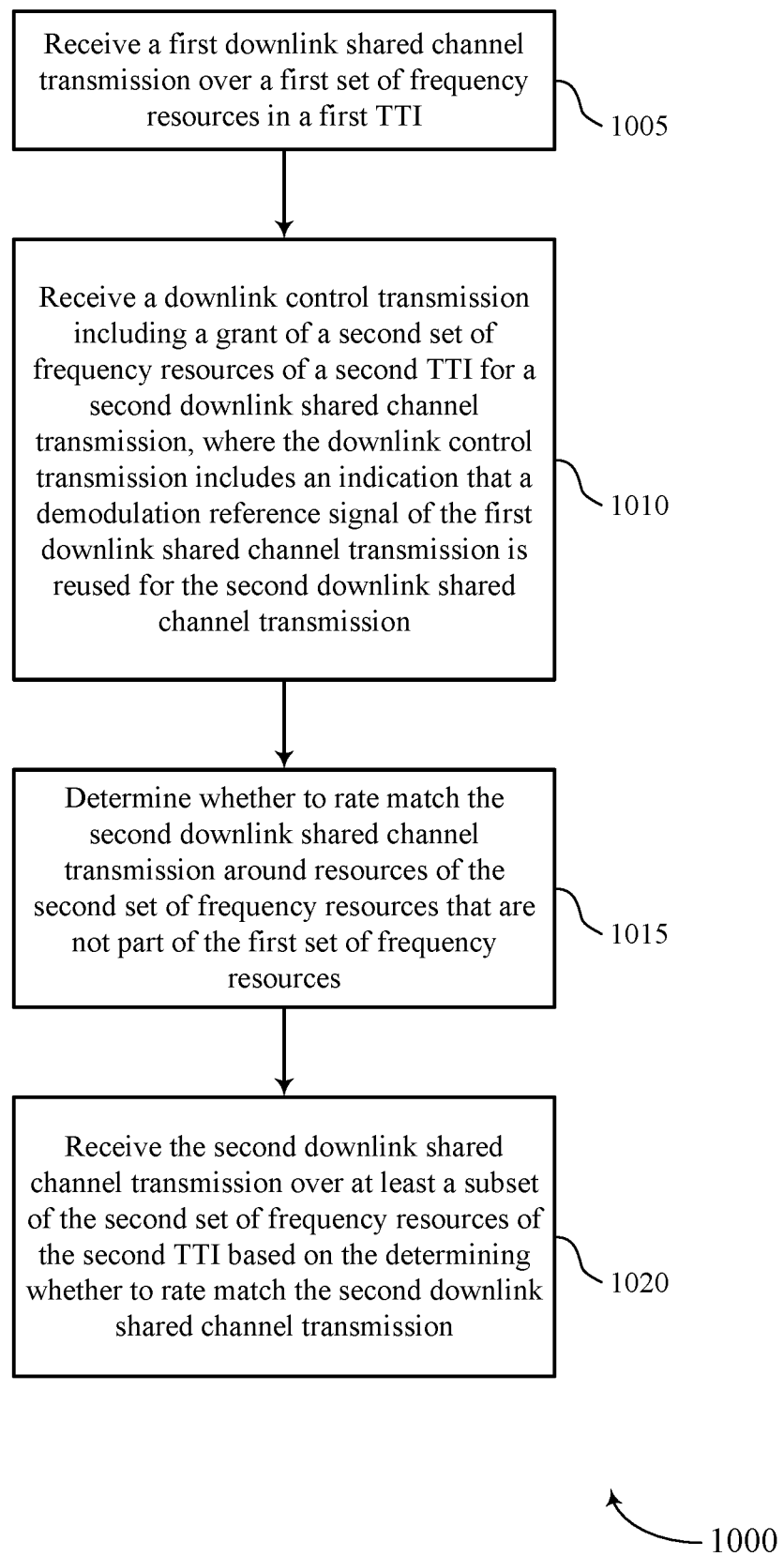
FIGS. 10 and 11 illustrate methods for sPDCCH reuse indication constraint under DMRS sharing in accordance with aspects of the present disclosure.

FIG. 10 shows a flowchart illustrating a method 1000 for sPDCCH reuse indication constraint under DMRS sharing in accordance with aspects of the present disclosure. The operations of method 1000 may be implemented by a UE 115 or its components as described herein. For example, the operations of method 1000 may be performed by a communications manager as described with reference to FIGS. 6 to 9. In some examples, a UE 115 may execute a set of codes to control the functional elements of the device to perform the functions described herein. Additionally or alternatively, the UE 115 may perform aspects of the functions described herein using special-purpose hardware.

At 1005, the UE 115 may receive a first downlink shared channel transmission over a first set of frequency resources in a first TTI. The operations of 1005 may be performed according to the methods described herein. In certain examples, aspects of the operations of 1005 may be performed by a downlink data component as described with reference to FIGS. 6 to 9.

At 1010, the UE 115 may receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission. The operations of 1010 may be performed according to the methods described herein. In certain examples, aspects of the operations of 1010 may be performed by a control channel component as described with reference to FIGS. 6 to 9.

At 1015, the UE 115 may determine whether to rate match the second downlink shared channel transmission around resources of the second set of frequency resources that are not part of the first set of frequency resources. The operations of 1015 may be performed according to the methods described herein. In certain examples, aspects of the operations of 1015 may be performed by a rate matching component as described with reference to FIGS. 6 to 9.

At 1020, the UE 115 may receive the second downlink shared channel transmission over at least a subset of the second set of frequency resources of the second TTI based at least in part on the determining whether to rate match the second downlink shared channel transmission. The operations of 1020 may be performed according to the methods described herein. In certain examples, aspects of the operations of 1020 may be performed by a downlink data component as described with reference to FIGS. 6 to 9.

Figure 11:
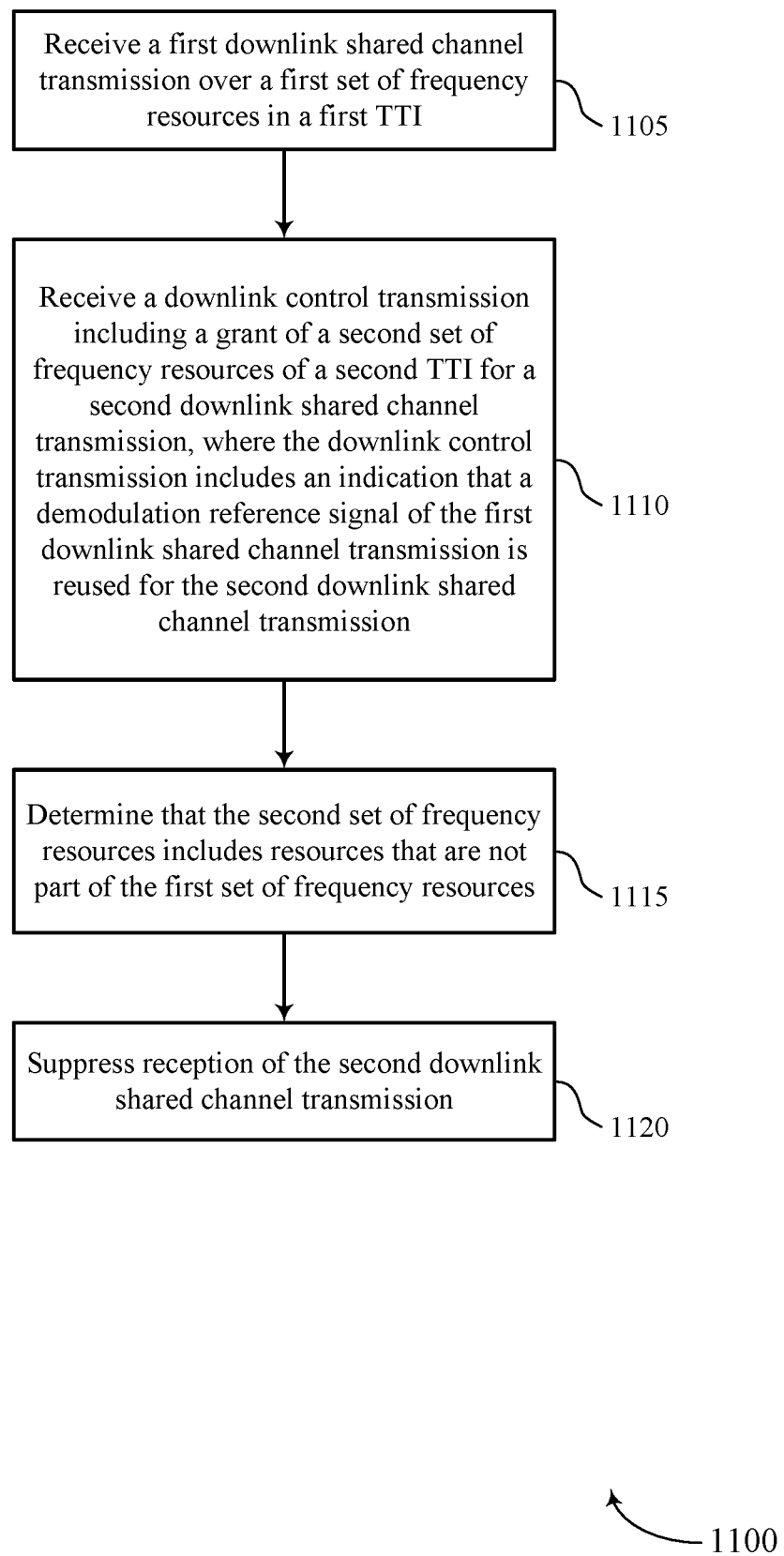

FIG. 11 shows a flowchart illustrating a method 1100 for sPDCCH reuse indication constraint under DMRS sharing in accordance with aspects of the present disclosure. The operations of method 1100 may be implemented by a UE 115 or its components as described herein. For example, the operations of method 1100 may be performed by a communications manager as described with reference to FIGS. 6 to 9. In some examples, a UE 115 may execute a set of codes to control the functional elements of the device to perform the functions described herein. Additionally or alternatively, the UE 115 may perform aspects of the functions described herein using special-purpose hardware.

At 1105, the UE 115 may receive a first downlink shared channel transmission over a first set of frequency resources in a first TTI. The operations of 1105 may be performed according to the methods described herein. In certain examples, aspects of the operations of 1105 may be performed by a downlink data component as described with reference to FIGS. 6 to 9.

At 1110, the UE 115 may receive a downlink control transmission including a grant of a second set of frequency resources of a second TTI for a second downlink shared channel transmission, where the downlink control transmission includes an indication that a demodulation reference signal of the first downlink shared channel transmission is reused for the second downlink shared channel transmission. The operations of 1110 may be performed according to the methods described herein. In certain examples, aspects of the operations of 1110 may be performed by a control channel component as described with reference to FIGS. 6 to 9.

At 1115, the UE 115 may determine that the second set of frequency resources includes resources that are not part of the first set of frequency resources. The operations of 1115 may be performed according to the methods described herein. In certain examples, aspects of the operations of 1115 may be performed by a control channel component as described with reference to FIGS. 6 to 9.

At 1120, the UE 115 may suppress reception of the second downlink shared channel transmission. The operations of 1120 may be performed according to the methods described herein. In certain examples, aspects of the operations of 1120 may be performed by a downlink data component as described with reference to FIGS. 6 to 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving a first downlink shared channel transmission over a first subset of a first set of frequency resources in a first transmission time interval (TTI);
    receiving a downlink control transmission comprising a grant of a second set of frequency resources of a second TTI for a second downlink shared channel transmission, wherein the downlink control transmission comprises an indication that a demodulation reference signal of the first downlink shared channel transmission is reused for the second downlink shared channel transmission;

determining whether to rate match the second downlink shared channel transmission around resources of the second set of frequency resources of the second TTI that overlap in frequency with a second subset of the first set of frequency resources that is exclusive of the first subset of the first set of frequency resources; and receiving the second downlink shared channel transmission over at least a subset of the second set of frequency resources of the second TTI based at least in part on the determining whether to rate match the second downlink shared channel transmission.

2. The method of claim 1, wherein the determining whether to rate match the second downlink shared channel transmission comprises determining to rate match the second downlink shared channel transmission around resources corresponding to a second downlink control transmission in the first TTI that is received over the second subset of the first set of frequency resources.

3. The method of claim 1, wherein the second set of frequency resources encompasses the resources corresponding to a second downlink control transmission in the first TTI.

4. The method of claim 1, wherein the determining whether to rate match the second downlink shared channel transmission is based at least in part on a number of layers of the second downlink shared channel transmission.

5. The method of claim 1, further comprising:
determining that the resources of the second set of frequency resources that overlap in frequency with the second subset of the first set of frequency resources are associated with a second downlink control transmission in the first TTI, the second downlink control transmission comprising a control channel demodulation reference signal; and
receiving at least a portion of the second downlink shared channel transmission over the resources in the second TTI.

6. The method of claim 5, further comprising:
demodulating the at least the portion of the second downlink shared channel transmission using the control channel demodulation reference signal.

7. The method of claim 1, wherein:
the downlink control transmission comprises a rate matching indicator; and
the determining whether to rate match the second downlink shared channel transmission is based at least in part on the rate matching indicator.

8. The method of claim 7, wherein:
the rate matching indicator comprises a first indicator associated with a first group of resources of the second set of frequency resources and a second indicator associated with a second group of resources of the second set of frequency resources; and
the determining whether to rate match comprises determining whether to rate match around the resources of the second set of frequency resources that overlap at least partially in frequency with the second subset of the first set of frequency resources for the first group of resources and the second group of resources.

9. The method of claim 1, wherein the demodulation reference signal of the first downlink shared channel transmission is used for channel estimation for all allocated frequency resource blocks of the second TTI.

10. An apparatus for wireless communications, comprising:
a processor,
memory in electronic communication with the processor; and
instructions stored in the memory and executable by the processor, to cause the apparatus to:
receive a first downlink shared channel transmission over a first subset of a first set of frequency resources in a first transmission time interval (TTI);
receive a downlink control transmission comprising a grant of a second set of frequency resources of a second TTI for a second downlink shared channel transmission, wherein the downlink control transmission comprises an indication that a demodulation reference signal of the first downlink shared channel transmission is reused for the second downlink shared channel transmission;
determine whether to rate match the second downlink shared channel transmission around resources of the second set of frequency resources of the second TTI that overlap in frequency with a second subset of the first set of frequency resources that excludes each frequency resource of the first set of frequency resources for receiving the first downlink shared channel transmission; and
receive the second downlink shared channel transmission over at least a subset of the second set of frequency resources of the second TTI based at least in part on the determining whether to rate match the second downlink shared channel transmission.

11. The apparatus of claim 10, wherein the determining whether to rate match the second downlink shared channel transmission comprises determining to rate match the second downlink shared channel transmission around resources corresponding to a second downlink control transmission in the first TTI that is received over the second subset of the first set of frequency resources.

12. The apparatus of claim 10, wherein the second set of frequency resources encompasses the resources corresponding to a second downlink control transmission in the first TTI.

13. The apparatus of claim 10, wherein the determining whether to rate match the second downlink shared channel transmission is based at least in part on a number of layers of the second downlink shared channel transmission.

14. The apparatus of claim 10, wherein the instructions are further executable by the processor to cause the apparatus to:
determine that the resources of the second set of frequency resources that overlap in frequency with the second subset of the first set of frequency resources are associated with a second downlink control transmission in the first TTI, the second downlink control transmission comprising a control channel demodulation reference signal; and
receive at least a portion of the second downlink shared channel transmission over the resources in the second TTI.

15. The apparatus of claim 14, wherein the instructions are further executable by the processor to cause the apparatus to:
demodulate the at least the portion of the second downlink shared channel transmission using the control channel demodulation reference signal.

16. The apparatus of claim 10, wherein:
the downlink control transmission comprises a rate matching indicator; and
the determining whether to rate match the second downlink shared channel transmission is based at least in part on the rate matching indicator.

17. The apparatus of claim 16, wherein:
the rate matching indicator comprises a first indicator associated with a first group of resources of the second set of frequency resources and a second indicator associated with a second group of resources of the second set of frequency resources; and
the determining whether to rate match comprises determining whether to rate match around the resources of the second set of frequency resources that overlap in frequency with the second subset of the first set of frequency resources for the first group of resources and the second group of resources.

18. The apparatus of claim 10, wherein the demodulation reference signal of the first downlink shared channel transmission is used for channel estimation for all allocated frequency resource blocks of the second TTI.

19. An apparatus for wireless communications, comprising:
means for receiving a first downlink shared channel transmission over a first subset of a first set of frequency resources in a first transmission time interval (TTI);
means for receiving a downlink control transmission of a second TTI and comprising a grant of a second set of frequency resources of a second TTI for a second downlink shared channel transmission, wherein the downlink control transmission comprises an indication that a demodulation reference signal of the first downlink shared channel transmission is reused for the second downlink shared channel transmission;
means for determining whether to rate match the second downlink shared channel transmission around resources of the second set of frequency resources of the second TTI that overlap in frequency with a second subset of the first set of frequency resources that excludes each frequency resource of the first set of frequency resources for receiving the first downlink shared channel transmission; and
means for receiving the second downlink shared channel transmission over at least a subset of the second set of frequency resources of the second TTI based at least in part on the determining whether to rate match the second downlink shared channel transmission.

20. The apparatus of claim 19, wherein the determining whether to rate match the second downlink shared channel transmission comprises determining to rate match the second downlink shared channel transmission around resources corresponding to a second downlink control transmission in the first TTI that is received over the second subset of the first set of frequency resources.

21. The apparatus of claim 19, wherein the second set of frequency resources encompasses the resources corresponding to a second downlink control transmission in the first TTI.

22. The apparatus of claim 19, wherein the determining whether to rate match the second downlink shared channel transmission is based at least in part on a number of layers of the second downlink shared channel transmission.

23. The apparatus of claim 19, further comprising:
means for determining that the resources of the second set of frequency resources that overlap in frequency with the second subset of the first set of frequency resources are associated with a second downlink control transmission in the first TTI, the second downlink control transmission comprising a control channel demodulation reference signal; and
means for receiving at least a portion of the second downlink shared channel transmission over the resources in the second TTI.

24. The apparatus of claim 23, further comprising:
means for demodulating the at least the portion of the second downlink shared channel transmission using the control channel demodulation reference signal.

25. The apparatus of claim 19, wherein:
the downlink control transmission comprises a rate matching indicator; and
the determining whether to rate match the second downlink shared channel transmission is based at least in part on the rate matching indicator.

26. The apparatus of claim 25, wherein:
the rate matching indicator comprises a first indicator associated with a first group of resources of the second set of frequency resources and a second indicator associated with a second group of resources of the second set of frequency resources; and
the determining whether to rate match comprises determining whether to rate match around the resources of the second set of frequency resources that overlap in frequency with the second subset of the first set of frequency resources for the first group of resources and the second group of resources.

27. The apparatus of claim 19, wherein the demodulation reference signal of the first downlink shared channel transmission is used for channel estimation for all allocated frequency resource blocks of the second TTI.

28. A non-transitory computer-readable medium storing code for wireless communications, the code comprising instructions executable by a processor to:
receive a first downlink shared channel transmission over a first subset of a first set of frequency resources in a first transmission time interval (TTI);
receive a downlink control transmission comprising a grant of a second set of frequency resources of a second TTI for a second downlink shared channel transmission, wherein the downlink control transmission comprises an indication that a demodulation reference signal of the first downlink shared channel transmission is reused for the second downlink shared channel transmission;
determine whether to rate match the second downlink shared channel transmission around resources of the second set of frequency resources of the second TTI that overlap in frequency with a second subset of the first set of frequency resources that excludes each frequency resource of the first set of frequency resources for receiving the first downlink shared channel transmission; and
receive the second downlink shared channel transmission over at least a subset of the second set of frequency resources of the second TTI based at least in part on the determining whether to rate match the second downlink shared channel transmission.

29. The non-transitory computer-readable medium of claim 28, wherein the determining whether to rate match the second downlink shared channel transmission comprises determining to rate match the second downlink shared channel transmission around resources corresponding to a second downlink control transmission in the first TTI that is received over the second subset of the first set of frequency resources.

30. The non-transitory computer-readable medium of claim 28, wherein the second set of frequency resources encompasses the resources corresponding to a second downlink control transmission in the first TTI.

31. The non-transitory computer-readable medium of claim 28, wherein the determining whether to rate match the second downlink shared channel transmission is based at least in part on a number of layers of the second downlink shared channel transmission.

32. The non-transitory computer-readable medium of claim 28, wherein the instructions are further executable by the processor to:
   determine that the resources of the second set of frequency resources that overlap in frequency with the second subset of the first set of frequency resources are associated with a second downlink control transmission in the first TTI, the second downlink control transmission comprising a control channel demodulation reference signal; and
   receive at least a portion of the second downlink shared channel transmission over the resources in the second TTI.

33. The non-transitory computer-readable medium of claim 32, wherein the instructions are further executable by the processor to:
   demodulate the at least the portion of the second downlink shared channel transmission using the control channel demodulation reference signal.

34. The non-transitory computer-readable medium of claim 28, wherein:
   the downlink control transmission comprises a rate matching indicator; and
   the determining whether to rate match the second downlink shared channel transmission is based at least in part on the rate matching indicator.

35. The non-transitory computer-readable medium of claim 34, wherein:
   the rate matching indicator comprises a first indicator associated with a first group of resources of the second set of frequency resources and a second indicator associated with a second group of resources of the second set of frequency resources; and
   the determining whether to rate match comprises determining whether to rate match around the resources of the second set of frequency resources that overlap with the second subset of the first set of frequency resources for the first group of resources and the second group of resources.

36. The non-transitory computer-readable medium of claim 28, wherein the demodulation reference signal of the first downlink shared channel transmission is used for channel estimation for all allocated frequency resource blocks of the second TTI.

\* \* \* \* \*